(12) United States Patent
Aeling et al.

(10) Patent No.: US 6,767,609 B2
(45) Date of Patent: Jul. 27, 2004

(54) PERFORATED FILM CONSTRUCTIONS FOR BACKLIT SIGNS

(75) Inventors: Ellen O. Aeling, St. Paul, MN (US); Neal T. Strand, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 09/835,725

(22) Filed: Apr. 16, 2001

(65) Prior Publication Data

US 2002/0034608 A1 Mar. 21, 2002

Related U.S. Application Data

(63) Continuation-in-part of application No. 09/663,507, filed on Sep. 15, 2000, now abandoned.

(51) Int. Cl.[7] ................................................. B32B 3/24
(52) U.S. Cl. .................. 428/137; 428/343; 428/913; 40/564; 40/579; 362/97
(58) Field of Search ............................... 428/137, 343, 428/913; 40/564, 579; 362/97

(56) References Cited

U.S. PATENT DOCUMENTS

| | | | |
|---|---|---|---|
| 3,694,945 A | | 10/1972 | Detiker |
| 4,673,609 A | * | 6/1987 | Hill ............................ 428/187 |
| 5,830,529 A | * | 11/1998 | Ross .......................... 427/152 |
| 5,882,774 A | | 3/1999 | Jonza et al. |
| 5,939,168 A | * | 8/1999 | Andriash ................. 219/121.7 |
| 5,954,423 A | * | 9/1999 | Logan et al. ............... 362/235 |
| 5,962,109 A | * | 10/1999 | Schwietz .................... 428/195 |
| 6,079,844 A | * | 6/2000 | Whitehead et al. ........... 362/97 |
| 6,080,467 A | | 6/2000 | Weber et al. |
| 6,155,689 A | * | 12/2000 | Smith ......................... 359/530 |
| 6,212,805 B1 | * | 4/2001 | Hill ............................. 40/443 |

FOREIGN PATENT DOCUMENTS

| WO | WO 99/26258 | 7/1999 |
|---|---|---|
| WO | WO 99/36248 | 7/1999 |
| WO | WO 99/36258 | 7/1999 |
| WO | WO 99/36809 | 7/1999 |
| WO | WO 99/36810 | 7/1999 |

OTHER PUBLICATIONS

Tips for Translucents, Brochure; 3M Image Graphics, ppl. 28–29 (1996).

"Light Management Films," Product Bulletin 3635, 3M (Apr. 2000).

* cited by examiner

Primary Examiner—William P. Watkins, III
(74) Attorney, Agent, or Firm—Colene H. Blank

(57) ABSTRACT

The present invention provides perforated film constructions, sign faces including the film constructions, and signs including the sign faces, all of which are capable of having one appearance under light ambient lighting conditions, and another appearance when backlit under dark ambient lighting conditions. The construction is generally planar and includes perforations that occupy, e.g., about 10–35% of the major surfaces of the construction. The perforations are separated by an opaque land area. The back surface of the film construction in the land area (i.e., the surface that is adapted to face the interior of the sign) reflects, e.g., at least about 50% of normal light incident thereon.

36 Claims, 6 Drawing Sheets

PERFORATED FILM CONSTRUCTIONS FOR BACKLIT SIGNS

RELATED APPLICATION

This is a continuation-in-part of U.S. patent application Ser. No. 09/663,507, titled PERFORATED FILM CONSTRUCTIONS FOR BACKLIT SIGNS, filed Sep. 15, 2000, now ABN which is hereby incorporated by reference in its entirety.

FIELD OF THE INVENTION

The present invention relates to signage. More particularly, the present invention relates to perforated film constructions for use in backlit signs that provide one appearance under light ambient light conditions (such as daytime lighting), and another appearance when backlit and under dark ambient lighting conditions (such as nighttime).

BACKGROUND OF THE INVENTION

Illuminated signs, sometimes referred to as light boxes, are often used to enhance the presentation of images and/or text. Examples of illuminated signs can be found in, e.g., airports, mass-transit stations, shopping malls and other public places. The signs typically include an enclosure having an illuminated face over which a graphic (including images and/or text) is located. The illumination is typically provided by lamps located behind the sign face and within the enclosure. The images and/or text in the graphic typically include transparent or translucent portions to enhance their visibility when placed over the illuminated face.

Common terminology used in connection with such signs refers to surfaces adapted to face a viewer as "first surfaces" and surfaces adapted to face the interior of the sign box (i.e., away from the viewer) as "second surfaces." That terminology will be used below.

Today there are four commonly used methods for making color by day and white by night back lit signage. The first method (which will only work to provide black and darker shades of gray or blue by day and white by night) uses a translucent black, gray or blue sign face. During the day (or other conditions where the light outside the sign box is light used for viewing the sign face) the color seen by the viewer is the reflected color off of the first surface of the sign face. The color seen by the viewer at night (or other conditions where the light inside the sign box is used for viewing the sign face) is the transmitted color. With this construction, the color of the sign face is washed out and, to the eye, appears white under nighttime viewing.

The second and third methods use block-out films. Block-out film is a two-layer construction where one layer is white and the second layer is a black, with the two layers combining to provide an opaque construction. Adhesive is applied to the dual film construction on the black side of the film (which serves as its second surface).

The second method takes block-out film and laminates a colored film to the white side (which serves as its first surface). This laminated construction is cut (often on a flat bed cutter) into thin lines of film. The film is cut in such a manner as to have alternating 9.5 mm (⅜-inch) strips of film separated by 3.2 mm (⅛ inch) open spaces across the sign face. The black sides of the strips are adhered to a translucent substrate with the colored surface facing the viewer to provide reflected color by day. At night, when the sign is illuminated from behind, light passing through the open spaces provides a white appearance. In some instances a color may be provided during backlighting by the use of colored bulbs, colored filters, colored diffusers, etc., such that light transmitted through the open spaces between the film strips has a color.

The third method of making a color by day white by night film is to punch block-out film with small holes and then screen print the white side to obtain a desired color in daytime viewing (under light reflecting from the first surface of the sign face). Generally, the area occupied by the holes in the punched film is 40% to 50%. The black surface of the block-out film is adhered to a translucent substrate with the white or printed surface facing the viewer to provide reflected color by day. At night, when the sign is illuminated from behind, light passing through the holes provides a white appearance. In some instances, a color may be provided during backlighting by the use of colored bulbs, colored filters, colored diffusers, etc., such that light transmitted through the holes has a color.

The fourth method of making color by day and white by night backlit signage uses paint. This involves painting a translucent face with black paint, followed by painting a second layer of color over the black paint. This dual coated face is then routed to form lines through the paint exposing the translucent face as desired. When backlit, the areas in which the paint has been removed transmit light to a viewer. During daylight, the sign takes on the appearance of the color or colors applied to the black paint.

All of these constructions have a major disadvantage—an absorptive layer (typically black or a darker shades of gray or blue) oriented towards the light source. The absorptive layer absorbs the light from the light source, thereby reducing the efficiency of the sign box. Another disadvantage of first method is that the dark gray or black rigid plastic is very expensive and this method is effective with only a few colors. Other disadvantages of the second and fourth methods (above) are their cost and labor intensive nature. Yet another disadvantage of the third method is that the large percent open area (40%–50%) often causes the color in the sign face to appear washed-out in the daytime and requires printing to obtain a desired color.

SUMMARY OF THE INVENTION

The present invention provides film constructions and signs including the constructions that are capable of having one appearance under light ambient lighting conditions, and another appearance when backlit under dark ambient lighting conditions. The construction is generally planar and includes perforations that are separated by an opaque land area. The second surface of the film construction in the land area (i.e., the surface that is adapted to face the interior of the sign) reflects, e.g., at least about 50% of normal light incident thereon.

In some instances, it may be preferred to provide larger or more numerous perforations that occupy, e.g., up to about 35% of the major surfaces of the construction. Film constructions with increased open area may provide improved brightness when backlit at night or in areas with lower levels of ambient light.

One advantage of the present invention is that backlit signs manufactured using the perforated constructions of the present invention can provide significant increases in brightness. In some instances, brightness of the signs when backlit can be as high as 120%, to more than 200%, as compared to signs using conventional films.

In one aspect, the present invention provides a generally planar film construction including a front surface and a back surface. A plurality of perforations are distributed over the construction, wherein each of the perforations transmits light through the front and back surfaces of the construction. Opaque land area separates the plurality of perforations and layer of adhesive is provided proximate the back surface of the construction. The perforations occupy about 10% to about 30% of the front and back surfaces of the construction, and at least about 50% of normal incident light directed at the land area of the back surface of the construction is reflected.

In another aspect, the present invention provides a sign face capable of having one appearance under light ambient lighting conditions, and another appearance when back lit and under dark ambient lighting conditions. The sign face includes a substrate having a first surface and a second surface. A film construction is attached to the first surface of the substrate, the construction including a front surface and a back surface, the back surface facing the first surface of the substrate. A plurality of perforations are distributed over the construction, wherein each of the perforations transmits light through the front and back surfaces of the construction. Opaque land area separates the plurality of perforations. The perforations occupy about 10% to about 30% of the front and back surfaces of the construction, and at least about 50% of normal incident light directed at the land area of the back surface of the construction is reflected.

In another aspect, the present invention provides a backlit sign including the sign face described above mounted on an enclosure.

These and other features and advantages of the invention are described below in connection with illustrative embodiments of the invention.

For purposes of the present invention, "film" means a sheet-like article having opposing major surfaces, capable of being handled and stored as a separate article.

For purposes of the present invention, "generally planar" means a construction having a relatively thin profile, with opposing major surfaces. Perforations are placed in the construction through the thinner dimension, so that light will pass through the construction and be visible when viewing the construction perpendicular to the major surfaces.

For purposes of the present invention, "light" means, unless otherwise specified, electromagnetic radiation in wavelengths that are typically visible to the unaided human eye.

For purposes of the present invention, "normal incident light" or "normal light incident thereon" mean light approaching a surface at a 90° angle to that surface.

For purposes of the present invention, "opaque" means transmission of less than about 0.01% of light within the spectrum of interest. For example, when used in connection with a backlit sign, an opaque construction will transmit less than about 0.01% of light emitted by the light sources located within the sign.

Reflectivity and transmission of the films and other materials discussed herein can be determined using a SPECTRAFLASH 500, available from Datacolor International, Lawerenceville, N.J. using the standard techniques for operating the device. The average reflectance/transmission values are over the wavelength range of 500–600 nanometers.

DETAILED DESCRIPTION OF ILLUSTRATIVE EMBODIMENTS OF THE INVENTION

In the past, it has been generally accepted that the back surface reflectivity of color-by-day-white-by-night film construction is unimportant because the light was not reflecting from the back surface of the film constructions but, rather, off the back of the substrates on which the films were mounted. It has surprisingly been found that an enhanced sign construction having a different appearance during light ambient lighting conditions as compared to dark ambient lighting condition may be made by using a construction including perforations separated by an opaque land area, wherein the second surface of the construction reflects a significant portion of light incident thereon.

Figure 1:
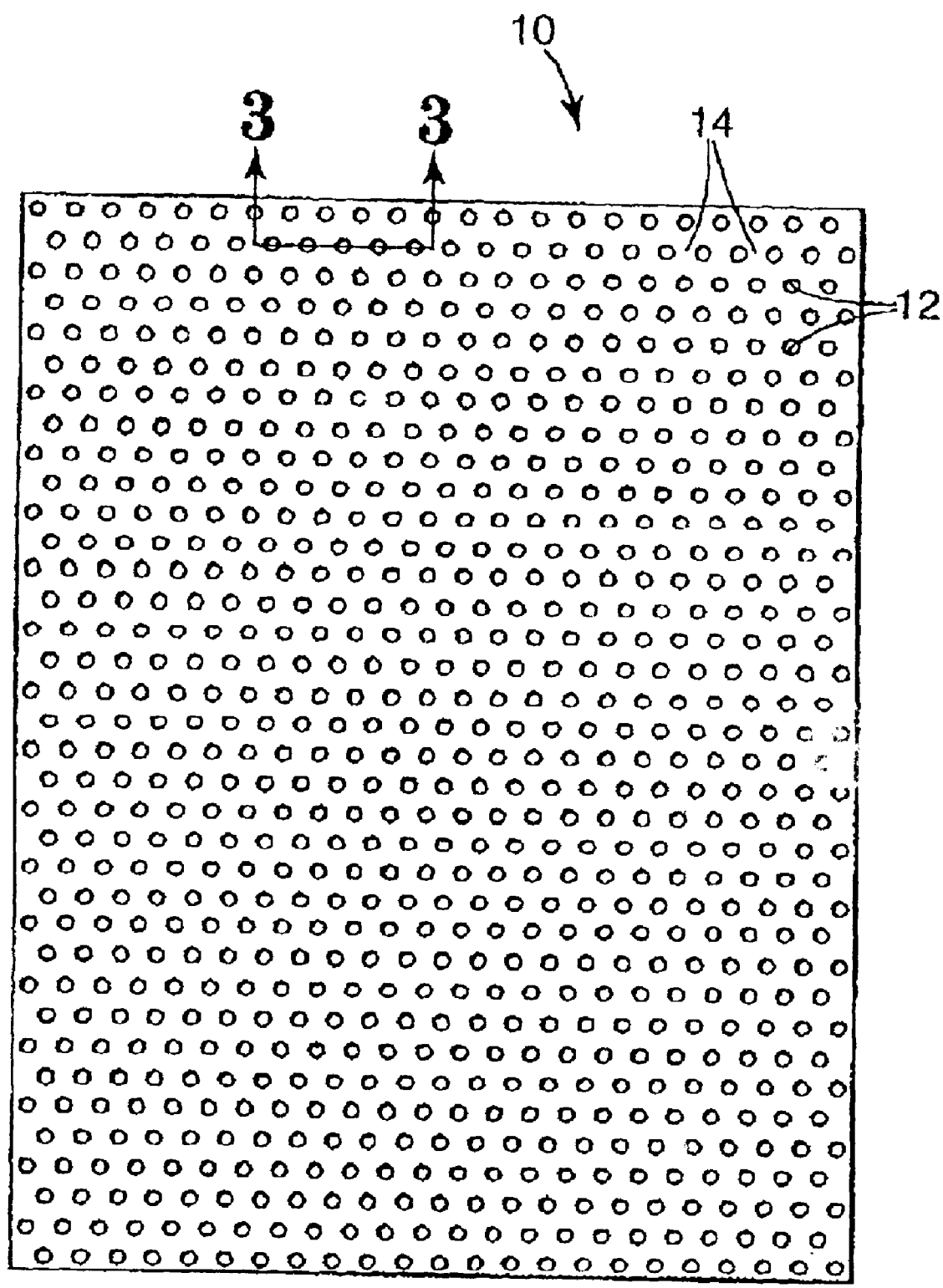
FIG. 1 is a plan view of one perforated construction according to the present invention.
Figure 2:
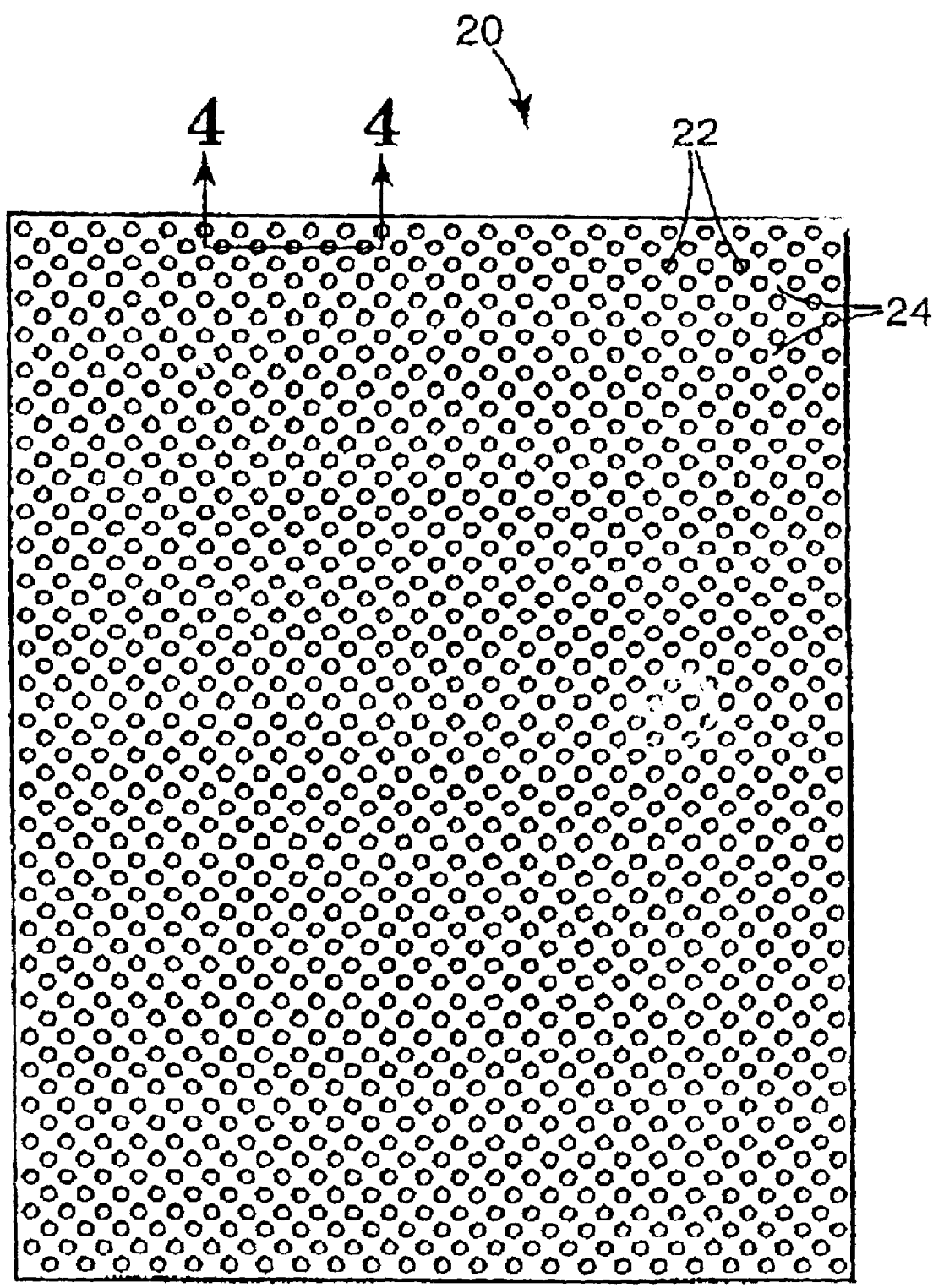
FIG. 2 is a plan view of another perforated construction according to the present invention.

FIG. 1 depicts one illustrative embodiment of a film construction 10 according to the present invention in which a plurality of perforations or apertures 12 are formed through the major surfaces of the construction 10. The perforations 12 are separated by land area 14 that is preferably opaque to light incident on the construction 10 from the second surface. The perforations 12 may be provided by any suitable technique, e.g., punching, die cutting, laser ablation, water jet cutting, etc. FIG. 2 depicts an alternative construction 20 in which perforations 22 are separated by land area 24, with the perforations 22 being more densely distributed over the major surfaces of the construction 20.

The size and the spacing of the perforations 12 over the major surfaces of the construction 10 may vary depending on a variety of factors, e.g., expected viewing distance, intensity of the expected back lighting, desired color saturation, etc. Any image or color provided on the surfaces of the construction 10 will be discontinuous, i.e., not be provided in the area occupied by the perforations 12, but only in the land area 14 surrounding the perforations 12. If the construction 10 is viewed closely, the perforations 12 will be apparent and the image or color on the surface will appear discontinuous. However, the size and spacing of the perforations 12 are preferably selected such that, when viewed at an expected viewing distance from the construction 10, the human eye will act to resolve the discontinuities such that the perforations 12 will not be apparent.

One manner in which the perforations 12 may be characterized is in the form of area of the major surfaces of the construction 10 occupied by the perforations 12. For example, it may be preferred that the perforations 12 occupy at least about 10% of the surface area of the construction. At the other end of the range, it may be preferred that the perforations 12 occupy about 30% or less of the area of the major surfaces of the construction 10.

If the film construction 10 is to be used in situations where brightness during backlighting is more important than color brightness when the film construction is viewed under only ambient light (i.e., without backlighting), then it may be preferred to provide perforations 12 that occupy more area, e.g., up to about 35% of the area of the major surfaces of the film construction.

Alternatively, if the film construction is to be used in situations where color brightness when the film construction is viewed under only ambient light (i.e., without backlighting) is more important than brightness during backlighting, then it may be preferred to provide perforations 12 that occupy, e.g., about 25% or less of the area of the major surfaces of the construction 10, in some instances about 20% or less of the area of the major surfaces of the construction 10.

It may be preferred that the perforations 12 be provided in a selected distribution pattern over the major surfaces of the construction 10. One preferred distribution pattern may be substantially uniform over the major surfaces of the construction 10, in which the size of the perforations 12 and the spacing between perforations 12 are both substantially uniform. Alternatively, one or both of the size and spacing may vary. Those variations may, however, provide a uniform amount of open space over a given unit area of the major surfaces of the construction 10.

Another potential variation in the construction 10 includes, e.g., variations in the shape of the perforations. For example, the perforations 12 preferably are circular (when viewed normal to the major surfaces of the construction 10), but may alternatively be triangular, diamond, square, oval, etc. Further, a variety of perforation shapes may be provided in the same construction 10. Although regular perforation shapes may be preferred, it may alternatively be desirable to provide irregularly-shaped perforations.

In one example, the perforations 12 may be circular in shape and have a diameter of about 0.02 to about 0.25 inches (about 0.05 cm to about 0.6 cm), more preferably about 0.04 to about 0.08 inches (about 0.1 cm to about 0.2 cm). Spacing between circular perforations 12 with diameters in these ranges may vary, for example, the spacing between perforations 12 may be about 0.16 inches (about 0.4 cm).

In film constructions of the present invention, it may be preferred that the size of the perforations be uniform throughout the thickness of the film construction. Referring to, e.g., FIG. 3, the perforations preferably have a uniform cross-sectional shape throughout the thickness of the film construction 30. In preferred constructions, each of the layers in the film construction 30 will be provided in the form of polymeric films (with the exception of an optional adhesive layer as described below). The perforations may preferably be formed after all of at least the polymeric film layers have been attached together such that alignment of the perforations between any of the layers is not required after the perforations have been formed. In addition, perforations formed after attachment of the polymeric film layers together, will typically have a uniform cross-sectional area through the thickness of the film construction 30.

Figure 3:
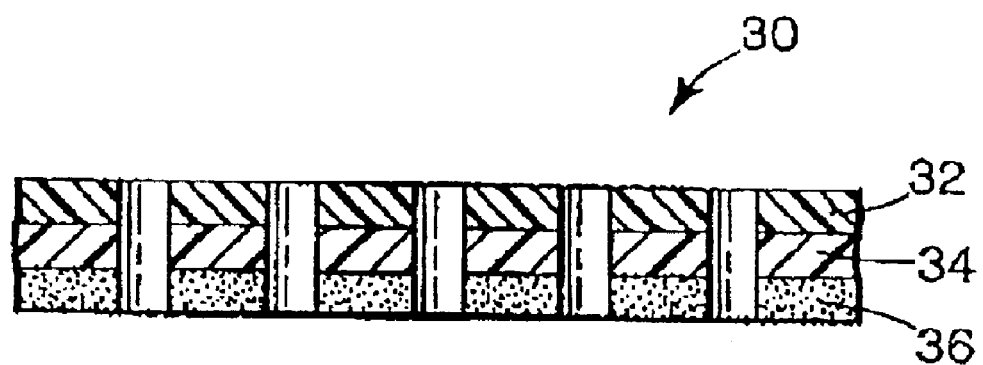
FIG. 3 is an enlarged cross-sectional view of the construction of FIG. 1 taken along line 3—3 in FIG. 1.

FIG. 3 depicts a cross-sectional view of construction 30 illustrating one potential combination of components including a color layer 32, an intermediate layer 34, and an optional adhesive layer 36. The color layer 32 may exhibit any desired color (including white, black, etc.) or the color layer 32 may exhibit an image to a viewer observing the exposed surface of the color layer 32. Although the color layer 32 and the intermediate layer 34 are depicted as unitary, homogeneous layers, either or both layers may be provided as a composite of two or more sub-layers of the same or different materials. If the color layer 32 and intermediate layer 34 are films, they may be attached by any suitable technique, e.g., adhesively, by heat and/or pressure lamination, etc. It may be preferred that the films include two or more layers of polymeric films attached together by any suitable technique. In some instances, it may be preferred that the constructions of the present invention consist essentially of polymeric films.

The color layer 32 may be provided in the form of a polymeric color film. Suitable polymeric color films may be made of, e.g., materials including, but not limited to, polyvinyl chloride, polyolefin materials (e.g., polyethylene or polypropylene), polyester, etc. The color layer 32 may be imageable, by any one or more of a variety of suitable imaging processes including, but are not limited to, electrostatic printing, ink jet printing, screen printing, etc. Other films and imaging processes may be used to provide suitable imageable films as well.

The intermediate layer 34 may be provided, in part, to opacify the construction 30 to prevent the transmission of light through the land area of the construction 30. The intermediate layer 34 may provide opacity by either reflection or absorption of light that is transmitted into this layer through either the color layer 32 or the adhesive layer 36.

Intermediate layer 34 need not provide the desired opacity alone, but may, instead, provide the desired opacity in combination with one or more other components in the construction 30. For example, one or both of color layer 32 and adhesive layer 36 may also contribute to the opacity of the land area of the construction 30.

The intermediate layer 34 may be any color as long as it provides the required opacity, although it may be preferred that the intermediate layer 34 be black or gray in color. Black has the advantage of better opacity for a given thickness, while gray has the advantage of easier color matching to a wider range of colors in any color layer 32. Either or both of the color layer 32 and the intermediate layer 34 may be provided as polymeric films that give body to the construction 30.

It may be preferred that the color layer 32 provide a significant portion of the opacity of the construction 30. For example, the color layer 32 may be black or a darker color such as, e.g., gray, blue, brown, etc. In such a construction, the intermediate layer 34 may be required to provide only a minor contribution to the opacity of the construction 30. As a result, it may be desirable to provide a lighter colored or reflective intermediate layer 34. For example, the intermediate layer 34 may be white or some other light color.

One particularly preferred construction 30 may be a color layer 32, white intermediate layer 34 and adhesive layer 36 for attaching the construction to a substrate. It may further be preferred that the color layer 32 be provided in the form of a non-black colored film (i.e., a film that exhibits a color other than black in ambient light) attached over a black polymeric film, with the black film being attached to the white intermediate layer 34. In some instances, it may be preferred that the exposed surface of the color layer 32 be substantially free of adhesive.

In other instances, the color layer 32 may be lighter colored, thus requiring that the intermediate layer 34 provide a significant portion of the opacity of the construction 30. If the opacity of the intermediate layer 34 is provided by absorption of incident light, the adhesive layer 36 may preferably include a suitable reflective pigment or otherwise be modified to provide the desired level of reflectivity off of the back surface of the construction 30.

Another construction that may be provided in connection with the invention may include a non-black color layer 32 and a black intermediate layer 34 to provide the desired opacity to the construction. In such a situation, reflectivity off of the back surface of the construction 30 may be provided by reflection from the adhesive layer 36.

Any suitable adhesive may be used, although it may be preferred to use a pressure sensitive adhesive, and more preferably an acrylate-based pressure sensitive adhesive. Reflectivity may be imparted to the adhesive layer 36 by any suitable method. For example, additives may be introduced into the adhesive (e.g., reflective pigments such as but not limited to titanium dioxide or barium sulfate, beads, etc.), small bubbles or voids may be formed in the adhesive to promote reflection, etc. Where the adhesive layer 36 provides reflectivity, it preferably meets the desired 50% reflectivity for normal incident light. Examples of some suitable reflective adhesives include acrylate-based pressure-sensitive adhesives including titanium dioxide pigment.

Where the intermediate layer 34 is reflective, it may be provided in a variety of forms. For example, a reflective intermediate layer 34 may include a reflective pigment, e.g., titanium dioxide in polyvinyl chloride, titanium dioxide in an acrylic binder, white pigment in polyolefin materials or barium sulfate in polyester. A reflective layer can also be obtained by microvoiding polymers such as polyester or polyolefins. The reflective layer can also be a metallized film such aluminum vapor coated polyester or vinyls or silver vapor coated films. Reflecting layer can be also arrived at by use of multilayer film constructions such as those described in, e.g., U.S. Pat. No. 5,882,774 (Jonza et al.); U.S. Pat. No. 6,101,032 (Wortman et al.); U.S. Pat. No. 6,179,948 (Merrill et al.); and International Publication Nos. WO 99/36809, WO 99/36810, WO 99/36248, and WO 99/36258.

Figure 4:
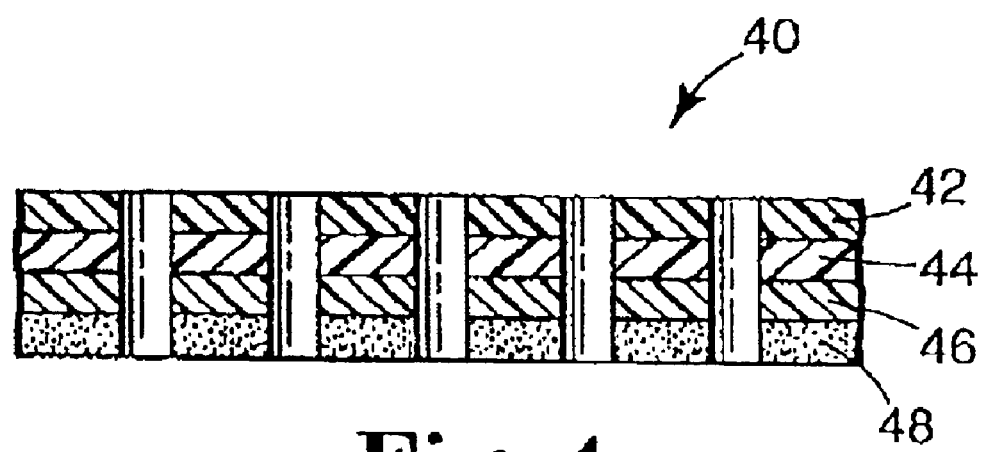
FIG. 4 is an enlarged cross-sectional view of the construction of FIG. 2 taken along line 4—4 in FIG. 2.

FIG. 4 depicts alternative construction 40 including a color layer 42, opaque layer 44, reflective layer 46, and adhesive layer 48. The opaque layer 44 may preferably provide opacity by absorbing incident light. The reflective layer 46 may serve to reflect a substantial portion of any light incident thereon, such that only a small portion, if any, of the light directed at the construction 40 from the back surface (i.e., through adhesive layer 48). If the reflective layer 46 is specularly reflective, it may be preferred that the adhesive layer 48 acts as a diffuser or otherwise disrupt specular reflection from the reflective layer 46.

Figure 5:
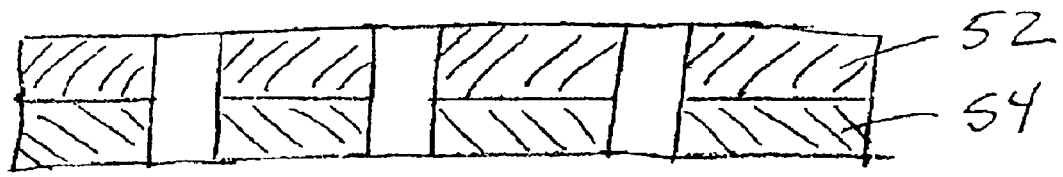
FIG. 5 is a cross-sectional view of another construction according to the present invention.

FIG. 5 illustrates a construction where layer 52 is the color layer and 54 is the reflective layer. This construction can optionally have adhesive on either side. The combination of the color layer 52 and the reflective layer 54 is opaque though each layer by itself may not be opaque.

Figure 6:
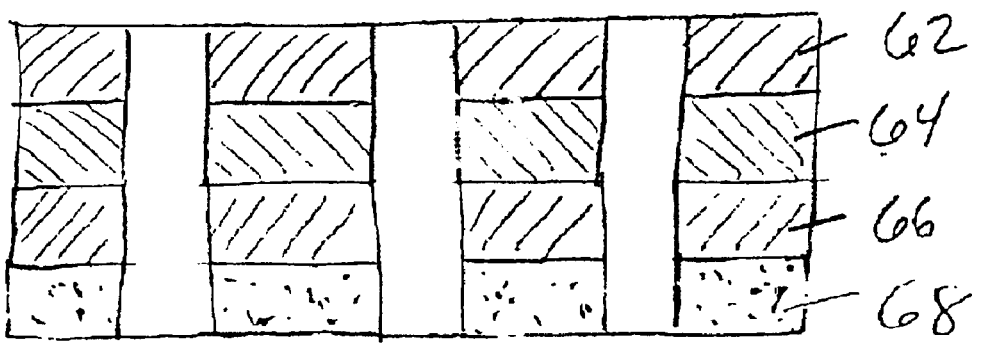
FIG. 6 is a cross-sectional view of another construction according to the present invention.

FIG. 6 illustrates a construction where colored films such as (but not limited to) 3M SCOTCHCAL ELECTROCUT Film Series 7725 or 3M SCOTCHCAL Translucent Film Series 3630 (layer 62 and 64) are laminated to a film 66 that provides opacity and reflectivity toward the light source. Layer 66 could be one layer or could be made up of several layer to provide the required reflectivity and opacity. An optional adhesive layer 68 could be used to attach this construction to a sign face.

Figure 7:
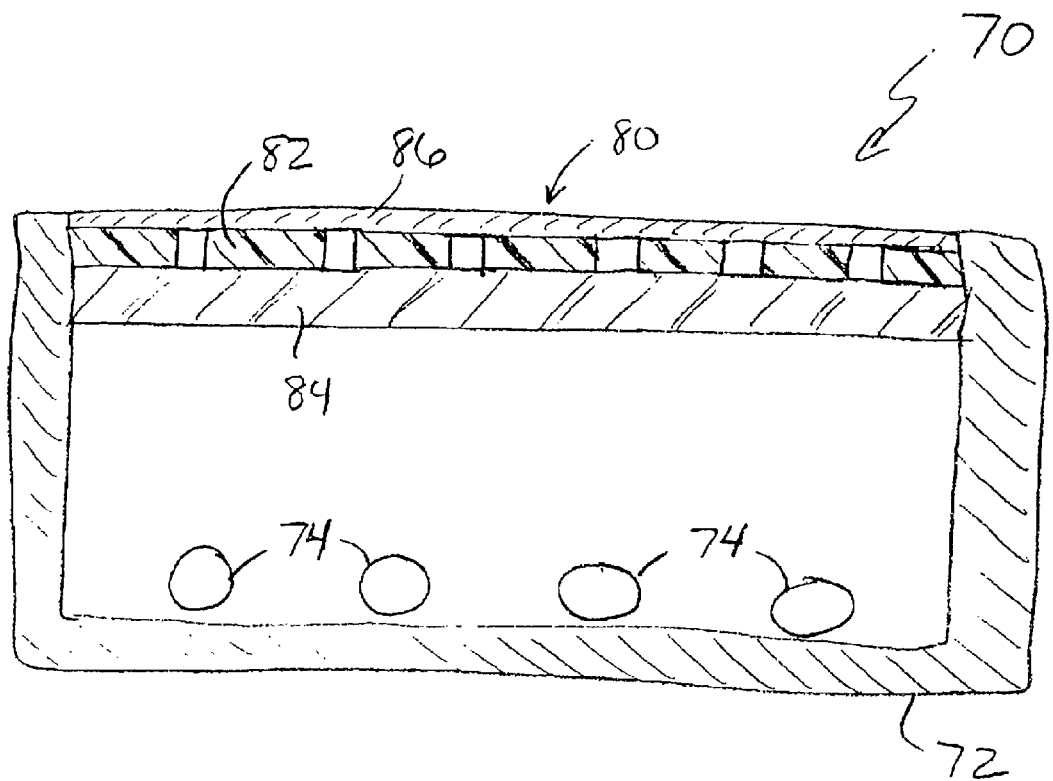
FIG. 7 is a diagram of a backlit sign including a construction according to the present invention.

FIG. 7 illustrates a sign 70 manufactured using the constructions of the present invention. The sign 70 includes a sign face 80 and an enclosure 72 in which a number of light sources 74, e.g., bulbs, are located. Although the sign 70 includes a plurality of light sources 74, it will be understood that the enclosure 72 may contain as few as one light source 74, or any number of light sources 74 as desired.

The sign face 80 in FIG. 7 includes a perforated construction 82 (in the form of, e.g., a film) attached to an optional substrate 84 that preferably transmits a substantial portion of light incident thereon. It may be further be preferred that the substrate 84 be diffusely transmissive and/or incorporate color filters such that light passing through the substrate 84 is colored. Also depicted in FIG. 7 is an optional transparent cover layer 86 provided over the construction 82. The optional cover layer 86 may prevent the accumulation of debris within the perforations formed through the construction 82.

Although the construction 82 is depicted on the outer surface of the substrate 84, i.e., the surface facing away from the light sources 74, it may be preferable in some instances to provide the construction on the inner surface of the substrate 84 such that the construction is located between the substrate 84 and the light sources 74.

EXAMPLES

The following examples have been selected merely to further illustrate features, advantages, and other details of the invention. It is to be expressly understood, however, that while the examples serve this purpose, the particular materials and components used, as well as other conditions and details, are not to be construed in a manner that would unduly limit the scope of this invention.

Test Methods

Luminance of illuminated signs in the example below was measured after the sign was operated for one hour to allow the lamp output to stabilize. The sign box used for this evaluation was a 13.25 inch by 13.25 inch (33.7 cm by 33.7 cm) light box made by Clearr Corporation. The lit face is 12 inch by 12 inch (30.5 cm by 30.5 cm). The sign box is illuminated by 3 fluorescent bulbs (Sylvania Cool White F13T8/CW).

Figure 8:
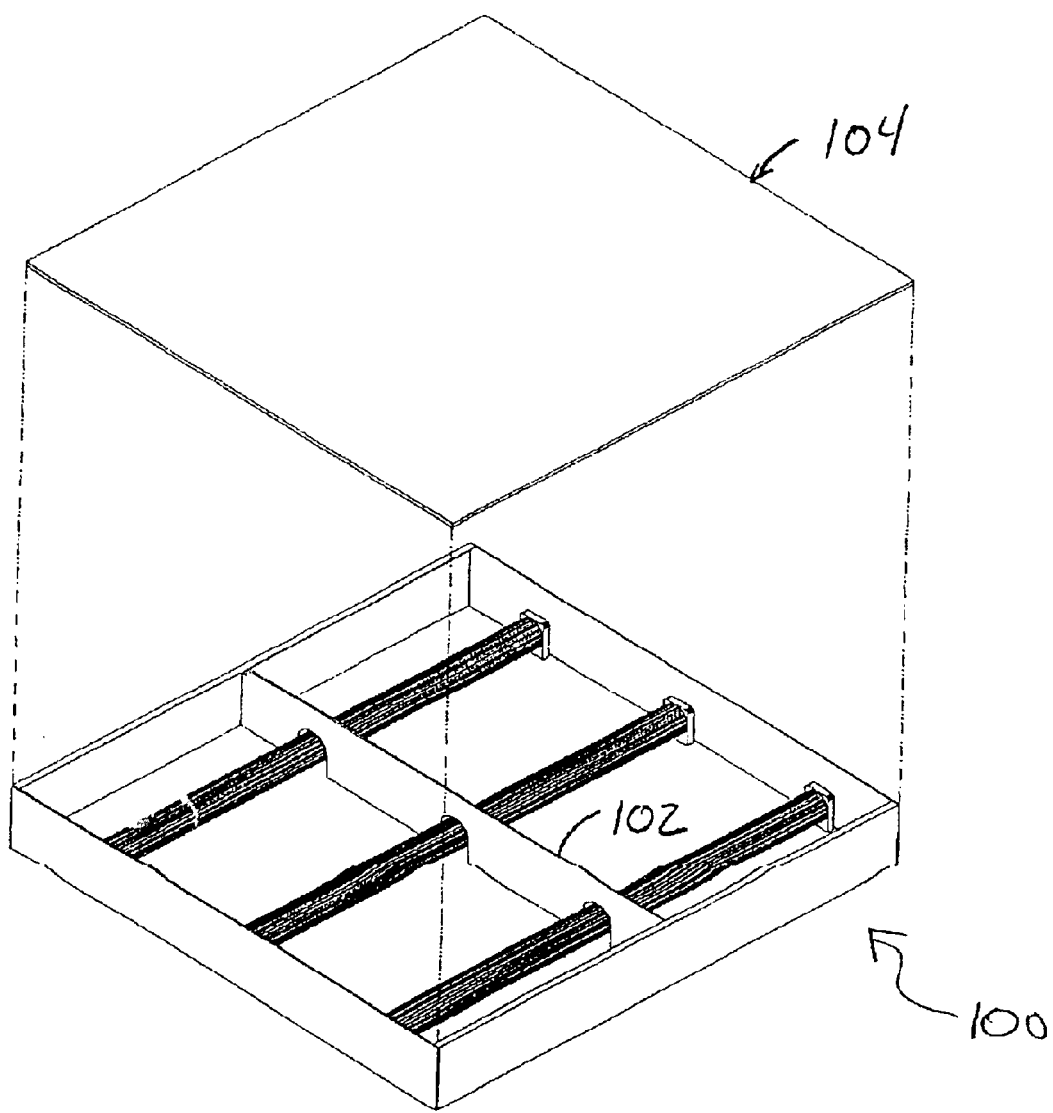
FIG. 8 is an exploded perspective view of a test apparatus used in the examples.

Referring to FIG. 8, the interior of the box 100 was divided into two equal volumes with an opaque baffle 102. The interior surfaces in one half of the box 100 were lined with 3M Light Enhancement Film 3635-100. The interior surfaces in the other half of the box were painted with white paint having a reflectivity of about 80%.

Sign faces 104 manufactured as described in each of the examples were located over the opening of the sign box and eighteen luminance measurements were taken over each half of the sign face 104 using a luminance meter manufactured by Minolta Camera Company (Model LS-110), which was held against the sign face in a variety if locations. The measurements were taken away from the edges of the sign face to avoid inconsistencies in luminance due the side walls within the sign. Each set of luminance measurements was averaged to obtain the relative luminance associated with each example.

Common Film Construction Characteristics

All of the film constructions in the examples were perforated (by punching) such that the perforations occupied 21% of the surface are of the constructions. The perforations were circular with a diameter of 0.0625 inches (1.6 mm). They were spaced apart in rows as depicted in, e.g., FIG. 1, with the spacing (center-to-center) between perforations within each row being about 0.1208 inches (3.07 mm). The perforations in adjacent rows were offset (See FIG. 1) and the spacing between adjacent rows (center-to-center) being about 0.108 inches (2.74 mm).

Two films were used to generate the examples, 3M Blockout Films 3635-20b and 3635-22b. Both are blockout films with less than 0.001% transmission of light over the visible spectrum. 3M Blockout Film 3635-22b is uniformly black on the front surface and uniformly white on the adhesive side. 3M Blockout Film 3635-20b is uniformly white on the face side and uniformly black on the adhesive side. Both are 0.004 inch (0.1 mm) thick vinyl films with an addition 0.001 inch (0.03 mm) of a pressure sensitive adhesive.

Example 1 (Comparative)

A construction including 3M Blockout Film 3635-20b (perforated as described above) was laminated to the first surface of a translucent substrate (PLEXIGLAS 2447). In this sign face construction, the black side of the film is facing into the sign box. No additional diffuser was used. Brightness of the sign face over the half of the sign box having painted interior surfaces was measured as described above.

Example 2

A construction including 3M Blockout Film 3635-22b (perforated as described above) was laminated to the first surface of a translucent substrate (PLEXIGLAS 2447). In this sign face construction, the white reflective side of the blockout film is facing into the sign box. No additional diffuser was used. Brightness of the sign face over the half of the sign box having painted interior surfaces was measured as described above. The test results showed that with a reflective back surface, a 138% increase in brightness was experienced as compared to Example 1.

Example 3 (Comparative)

The construction of Example 1 was tested with one change. Brightness of the sign face over the half of the sign box having interior surfaces lined with 3M Light Enhancement Film 3635-100 was measured as described above.

Example 4

The construction of Example 2 was tested with one change. Brightness of the sign face over the half of the sign box having interior surfaces lined with 3M Light Enhancement Film 3635-100 was measured as described above. The test results showed that with a reflective back surface, a 179% increase in brightness was experienced as compared to Example 3.

Example 5 (Comparative)

A construction including perforated 3M Blockout Film 3635-20b attached to a translucent substrate (PLEXIGLAS 2447). In this sign face construction, the black side of the blockout film is facing into the sign box. A diffuser in the form of a layer of 3M Diffuser Film 3635-70 was laminated to the second surface of the substrate. Brightness of the sign face over the half of the sign box having painted interior surfaces was measured as described above.

Example 6

The construction of Example 5 including perforated 3M Blockout Film 3635-22b (perforated as described above) was laminated to the first surface of a translucent substrate (PLEXIGLAS 2447). In this sign face construction, the white reflective side of the blockout film is facing into the sign box. A diffuser in the form of a layer of 3M Diffuser Film 3635-70 was laminated to the second surface of the substrate. Brightness of the sign face over the half of the sign box having painted interior surfaces was measured as described above. The test results showed that with a reflective back surface, a 149% increase in brightness was experienced as compared to Example 5.

Example 7 (Comparative)

The construction of example 5 was tested with one change. Brightness of the sign face over the half of the sign box having interior surfaces lined with 3M Light Enhancement Film 3635-100 was measured as described above.

Example 8

The construction of Example 6 was tested with one change. Brightness of the sign face over the half of the sign box having interior surfaces lined with 3M Light Enhancement Film 3635-100 was measured as described above. The test results showed that with a reflective back surface, a 176% increase in brightness was experienced as compared to Example 7.

Example 9 (Comparative)

A construction including perforated 3M Blockout Film 3635-20b was attached to a translucent substrate (PLEXIGLAS 2447). A diffuser in the form of a layer of 3M Diffuser Film 3635-30 was laminated on the second surface of the substrate facing the interior of the test box. Brightness of the sign face over the half of the sign box having painted interior surfaces was measured as described above.

Example 10

The construction of perforated 3M Blockout Film 3635-22b was laminated to the first surface of a translucent substrate (PLEXIGLAS 2447). In this sign face construction, the white reflective side of the blockout film is facing into the sign box. A diffuser in the form of a layer of 3M Diffuser Film 3635-30 was laminated to the second surface of the substrate. Brightness of the sign face over the half of the sign box having painted interior surfaces was measured as described above. The test results showed that with a reflective back surface, a 165% increase in brightness was experienced as compared to Example 9.

Example 11 (Comparative)

The construction of example 9 was tested with one change. Brightness of the sign face over the half of the sign box having interior surfaces lined with 3M Light Enhancement Film 3635-100 was measured as described above.

Example 12

The construction of Example 10 was tested with one change. Brightness of the sign face over the half of the sign box having interior surfaces lined with 3M Light Enhancement Film 3635-100 was measured as described above. The test results showed that with a reflective back surface, a 220% increase in brightness was experienced as compared to Example 11.

Example 13 (Comparative)

A construction similar to that used in Example 1 was manufactured, except that the translucent substrate used was LEXAN SG400-7328 (GE Plastics) in place of the PLEXIGLAS 2447. Brightness of the sign face over the half of the sign box having painted interior surfaces was measured as described above.

Example 14

A construction similar to that used in Example 2 was manufactured, except that the translucent substrate used was LEXAN SG400-7328 in place of the PLEXIGLAS 2447. No separate diffuser was provided. Brightness of the sign face over the half of the sign box having painted interior surfaces was measured as described above. The test results showed that with a reflective back surface, a 135% increase in brightness was experienced as compared to Example 13.

Example 15 (Comparative)

The construction of Example 13 was tested with one change. Brightness of the sign face over the half of the sign box having interior surfaces lined with 3M Light Enhancement Film 3635-100 was measured as described above.

Example 16

The construction of Example 14 was tested with one change. Brightness of the sign face over the half of the sign box having interior surfaces lined with 3M Light Enhancement Film 3635-100 was measured as described above. The test results showed that with a reflective back surface, a 131% increase in brightness was experienced as compared to Example 15.

The preceding specific embodiments are illustrative of the practice of the invention. This invention may be suitably practiced in the absence of any element or item not specifically described in this document. The complete disclosures of all patents, patent applications, and publications are incorporated into this document by reference as if individually incorporated in total.

Various modifications and alterations of this invention will become apparent to those skilled in the art without departing from the scope of this invention, and it should be understood that this invention is not to be unduly limited to illustrative embodiments set forth herein, but is to be controlled by the limitations set forth in the claims and any equivalents to those limitations.

What is claimed is:

1. A generally planar film construction comprising
    a front surface and a back surface, the construction comprising a thickness between the front surface and the back surface;
    a plurality of perforations distributed ovate construction, wherein each perforation of the plurality of perforations transmits light through the construction, and further wherein each perforation of the plurality of perforations comprises a uniform cross-sectional area throughout the thickness of the construction;
    opaque land area separating the plurality of perforations; and
    a layer of adhesive proximate the back surface of the construction, wherein the adhesive comprises a reflective pigment; and
    wherein the plurality of perforations occupy about 10% to about 35% of the front and back surfaces of the construction.

2. The construction of claim 1, wherein the adhesive comprises a pressure sensitive adhesive.

3. The construction of claim 1, wherein at least about 50% of normal incident light directed at the land area of the back surface of the construction is reflected.

4. The construction of claim 1, wherein the reflective pigment comprises a white pigment.

5. The construction of claim 1, wherein the reflective pigment is selected from the group consisting of titanium dioxide, barium sulfate, and combinations thereof.

6. The construction of claim 1, wherein at least about 80% of normal incident light directed at the land area on the back surface of the construction is reflected.

7. The construction of claim 1, wherein the opaque land area comprises an absorptive material that provides opacity by absorption of light incident thereon.

8. The construction of claim 1, wherein the construction comprises a non-black color layer proximate the front surface and an opaque, light absorptive intermediate layer proximate the back surface.

9. The construction of claim 8, wherein the intermediate layer is selected from the group consisting of a black layer, gray layer, blue layer, and brown layer.

10. The construction of claim 1, comprising a non-black color layer attached to a black intermediate layer, and further wherein at least about 50% of normal incident light directed at the lend area of the back surface of the construction is reflected.

11. The construction of claim 1, wherein the construction comprises a color layer attached to a white intermediate layer, wherein the color layer forms the front surface of the construction and the white intermediate layer forms the back surface of the construction.

12. The construction of claim 1, wherein the color layer comprises a black polymeric film attached to the white intermediate layer.

13. A generally planar film construction comprising
    a front surface and a back surface, the construction comprising a thickness between the front surface and the back surface, a non-black color layer proximate the front surface, and an opaque, light absorptive intermediate layer proximate the back surface;
    a plurality of perforations distributed over the construction, wherein each perforation of the plurality of perforations transmits light through the construction, and further wherein each perforation of the plurality of perforations comprises a uniform cross-sectional area throughout the thickness of the construction;
    opaque land area separating the plurality of perforations; and
    a layer of reflective pressure sensitive adhesive on the opaque, light absorptive intermediate layer, wherein the reflective pressure sensitive adhesive comprises a reflective pigment.

14. The construction of claim 13, wherein the reflective pigment comprises a white pigment.

15. The construction of claim 13, wherein the reflective pigment is selected from the group consisting of titanium dioxide, barium sulfate, and combinations thereof.

16. The construction of claim 13, wherein the intermediate layer is selected from the group consisting of a black layer, gray layer, blue layer, and brown layer.

17. The construction of claim 13, wherein at least about 50% of normal incident light directed at the land area of to back surface of the construction is reflected.

18. The construction of claim 13, wherein at least about 80% of manual incident light directed at the land area on the back surface of the construction is reflected.

19. A sign face capable of having one appearance under light ambient lighting conditions, and another appearance when back lit and under dark ambient lighting conditions, the sign face comprising:
    a substrate comprising a first surface facing a viewer and a second surface facing away from a viewer;
    a film construction attached tote first surface of the substrate, the construction comprising:
        a front surface and a back surface, the construction comprising a thickness between the front surface and the back surface;

a plurality of perforations distributed over the construction, wherein each perforation of the plurality of perforations transmits light through the construction, and further wherein each perforation of the plurality of perforations comprises a uniform cross-sectional area throughout the thickness of the construction;

opaque land area separating the plurality of perforations; and a layer of adhesive attaching the back surface of the construction to the first surface of the substrate, wherein the adhesive comprises a reflective pigment.

20. The sign face of claim 19, wherein the adhesive comprises a pressure sensitive adhesive.

21. The sign face of claim 19, wherein at least about 50% of normal incident light directed at the land area of the back surface of the construction is reflected.

22. The sign face of claim 19, wherein the reflective pigment comprises a white pigment.

23. The sign face of claim 19, wherein the reflective pigment is selected from the group consisting of titanium dioxide, barium sulfate, and combinations thereof.

24. The sign face of claim 19, wherein the construction comprises a non-black color layer proximate the front surface and an opaque, light absorptive intermediate layer proximate the back surface.

25. The sign face of claim 24, wherein the intermediate layer is selected from the group consisting of a black layer, gray lay, blue layer, and brown layer.

26. The sign face of claim 19, further comprising a diffuser attached to the second surface of the substrate.

27. The sign face of claim 19, wherein substrate diffuses light transmitted therethrough.

28. A backlit sign comprising:

an enclosure comprising an interior;

a sign face capable of having one appearance under light ambient lighting conditions, and another appearance when backlit and under dark ambient lighting conditions, the sign face comprising:

a substrate comprising a first surface facing away from the interior of the enclosure and a second surface facing the interior of the enclosure;

a film construction attached to the first surface of the substrate, the construction comprising:

a front surface and a back surface, the construction comprising a thickness between the front surface and the back surface;

a plurality of perforations distributed over the construction, wherein each perforation of the plurality of perforations transmits light through the construction, and further wherein each perforation of the plurality of perforations comprises a uniform cross-sectional area throughout the thickness of the construction;

opaque land area separating the plurality of perforations; and a layer of adhesive attaching the back surface of the construction to the first surface of the substrate, wherein the adhesive comprises a reflective pigment.

29. The backlit sign of claim 28, wherein the adhesive comprises a pressure sensitive adhesive.

30. The backlit sign of claim 28, wherein at least about 50% of normal incident light directed at the land area of the back surface of the construction is reflected.

31. The backlit sign of claim 28, wherein the reflective pigment comprises a white pigment.

32. The backlit sign of claim 28, wherein the reflective pigment is selected from the group consisting of titanium dioxide, barium sulfate, and combinations thereof.

33. The backlit sign of claim 28, wherein the construction comprises a non-black color layer proximate the front surface and an opaque, light absorptive intermediate layer proximate the back surface.

34. The backlit sign of claim 28, wherein the intermediate layer is selected from the group consisting of a black layer, gray layer, blue layer, and brown layer.

35. The backlit sign of claim 28, further comprising a diffuser attached to the second surface of the substrate.

36. The backlit sign of claim 28, wherein the substrate diffuses light transmitted therethrough.

\* \* \* \* \*

UNITED STATES PATENT AND TRADEMARK OFFICE
CERTIFICATE OF CORRECTION

PATENT NO. : 6,767,609 B2
DATED : July 27, 2004
INVENTOR(S) : Aeling, Ellen O.

It is certified that error appears in the above-identified patent and that said Letters Patent is hereby corrected as shown below:

Column 10,
Line 61, delete "Brightess" and insert in place thereof -- Brightness --.

Column 11,
Line 41, delete "ovate" and insert in place thereof -- over the --.

Column 12,
Line 14, delete "lend" and insert in place thereof -- land --.
Line 52, delete "to" and insert in place thereof -- the --.
Line 55, delete "manual" and insert in place thereof -- normal --.
Lien 63, delete "tote" and insert in place thereof -- to the --.

Column 13,
Line 29, delete "lay" and insert in place thereof -- layer --.
Line 32, after "wherein" insert -- the --.

Signed and Sealed this

Eighteenth Day of January, 2005

JON W. DUDAS
*Director of the United States Patent and Trademark Office*